United States Patent [19]

Lin et al.

[11] Patent Number: 6,057,407
[45] Date of Patent: May 2, 2000

[54] HIGH MELT FLOW PROPYLENE POLYMER PRODUCED BY GAS-PHASE POLYMERIZATION

[75] Inventors: Chi-Hung Lin, Wheaton, Ill.; Dennis L. McGinn, Alpharetta, Ga.; Jerome A. Streeky, Alpharetta, Ga.; H. Dale Wilson, Jr., Alpharetta, Ga.; Kanokrot Ja Phalakornkul, Alpharetta, Ga.

[73] Assignee: BP Amoco Corporation, Chicago, Ill.

[21] Appl. No.: 09/003,995

[22] Filed: Jan. 7, 1998

Related U.S. Application Data

[60] Provisional application No. 60/035,226, Jan. 8, 1997.

[51] Int. Cl.$^7$ ....................................................... C08F 2/38
[52] U.S. Cl. ...................... 526/128; 526/125.3; 526/351; 526/901; 526/905; 502/152; 502/158; 502/103
[58] Field of Search ................................ 526/125.3, 128, 526/351, 901, 905

[56] References Cited

U.S. PATENT DOCUMENTS

| | | | |
|---|---|---|---|
| 3,960,987 | 6/1976 | Kelley et al. | 260/878 B |
| 4,369,306 | 1/1983 | Toyota et al. | 528/485 |
| 4,451,589 | 5/1984 | Morman et al. | 523/124 |
| 4,535,068 | 8/1985 | Job | 502/107 |
| 4,588,790 | 5/1986 | Jenkins, III et al. | 526/70 |
| 4,829,038 | 5/1989 | Hoppin et al. | 502/125 |
| 4,952,649 | 8/1990 | Kioka et al. | 526/125 |
| 4,990,479 | 2/1991 | Ishimaru et al. | 502/125 |
| 5,159,021 | 10/1992 | Kioka et al. | 525/247 |
| 5,218,052 | 6/1993 | Cohen et al. | 525/240 |
| 5,271,883 | 12/1993 | Timmons et al. | 264/6 |
| 5,414,063 | 5/1995 | Seeger et al. | 526/88 |
| 5,529,850 | 6/1996 | Morini et al. | 428/500 |

FOREIGN PATENT DOCUMENTS

| | | |
|---|---|---|
| 0320150 | 6/1989 | European Pat. Off. . |
| 0385765 | 9/1990 | European Pat. Off. . |
| 0445303 | 9/1991 | European Pat. Off. . |
| 0452916 | 10/1991 | European Pat. Off. . |
| 0622380 | 11/1994 | European Pat. Off. . |
| 0601496 | 6/1999 | European Pat. Off. . |
| 5093014 | 4/1993 | Japan . |
| 94/06833 | 3/1994 | WIPO . |
| 9406833 | 3/1994 | WIPO . |
| 95/21203 | 8/1995 | WIPO . |
| 9521203 | 8/1995 | WIPO . |

OTHER PUBLICATIONS

"Use of High Tacticity Catalysts To Produce Ultra High Melt–Flow Rate Polypropylene," Anonymous, Research Disclosure, Oct. 1993, pp. 35440.

*Primary Examiner*—David W. Wu
*Assistant Examiner*—Lung-Siu Choi
*Attorney, Agent, or Firm*—Wallace L. Oliver

[57] ABSTRACT

A process to produce high melt flow propylene polymer comprises polymerizing propylene in the presence of a titanium-containing, magnesium-containing, high activity catalyst and an aluminum alkyl cocatalyst in a gas phase system which uses condensed liquid to control temperature wherein the external catalyst modifier is a tetraalkylorthosilicate, preferably tetraethylorthosilicate, at process conditions of temperature, hydrogen concentration, and Si/Mg, Al/Mg and Al/Si atomic ratios, to produce a high melt flow propylene polymer at high yield.

20 Claims, No Drawings

HIGH MELT FLOW PROPYLENE POLYMER PRODUCED BY GAS-PHASE POLYMERIZATION

CROSS-REFERENCE TO RELATED APPLICATIONS

This application claims the benefit of U.S. Provisional Application Ser. No. 60/035,226, filed Jan. 8, 1997, which is incorporated by reference herein.

BACKGROUND OF THE INVENTION

This invention relates to production of high melt flow propylene polymer and, particularly, relates to producing high melt flow polypropylene by gas-phase polymerization without additional peroxide treatment.

Recently, there has been widespread use of solid, hydrocarbon-insoluble, magnesium halide-supported, titanium-containing high activity catalysts ("HAC") to produce propylene polymer resins. Use of solid, transition metal-based, HAC, olefin polymerization catalyst components is well known in the art including such solid components supported on a metal oxide, halide or other salt such as widely-described magnesium-containing, titanium halide-based catalyst components.

In addition to the solid, magnesium-containing, titanium-containing HAC catalyst component, the polymerization catalyst system used to produce propylene polymers uses an aluminum alkyl component, such as triethylaluminum, and typically an external modifier component such as a silane compound as described in U.S. Pat. No. 4,829,038, incorporated by reference herein. Use of external silane modifiers in a propylene polymerization catalyst system has been widely described. Use of alkyl or aryl methoxysilanes, and particularly dialkyldimethoxysilanes, has been described. The present invention describes using a specific silane composition as an external modifier together with specific process conditions to produce a high melt flow polymer in a gas-phase polymerization reactor, which has not been possible in conventional process systems.

Melt flow rate (MFR) is measured in units of grams of polymer extruded under standard conditions per unit of time, usually grams/10 minutes according to ASTM D1238 Condition L. For high MFR, ASTM 1238 230/2.16 with a die diameter of 1.045 mm and length of 4.0 mm may be used. A standard calibration factor is used to correlate to ASTM D1238 measurements. Typically, MFR is controlled in a propylene polymerization reactor by varying the hydrogen content in the reactor. However, in order to produce high melt flow rate polymer, increased hydrogen concentration leads to a loss of catalyst activity to an extent which makes direct production of high melt flow polymer commercially impractical. In bulk or slurry polymerization systems, the melt flow rate of a polymer is limited by the effective solubility of hydrogen in the liquid polymerization medium in combination with pressure limitations on the polymerization reactor system.

Conventionally, propylene polymers having a melt flow rate above about 400 g/10 min. are manufactured by a secondary treatment of a reactor-produced polymer powder with a peroxide using controlled rheology techniques. Although controlled rheology peroxide treatment produces high melt flow products with melt flow rates up to 3000 g/10 min. and above, a controlled rheology process requires additional manufacturing equipment and is less efficient than a process which could produce high melt flow product directly in a polymerization reactor. Further, products produced through controlled rheology methods, contain oxygenated residues and very short chain oligomers which may cause fiber breaks if the polymer is used to manufacture melt blown fiber. A reactor-produced high melt flow product is more uniform than a controlled rheology product, which leads to better processing for melt blown fiber production.

This invention describes a process to produce high melt flow polypropylene directly in a gas-phase reactor at acceptable commercial yields without use of a secondary controlled rheology treatment. This process is especially useful in a gas-phase process in which gaseous monomer is condensed into a liquid which may be used to regulate reaction temperature. Since any hydrogen used for melt flow rate control cannot be condensed in such a process, there is a practical maximum to hydrogen concentration. Such hydrogen concentration maximum limits the ability of such process to produce high melt flow product directly in the reactor.

In this invention, a gas-phase polymerization process, typically using a supported catalyst system and an aluminum alkyl co-catalyst, incorporates tetraethylorthosilicate (TEOS) as an external catalyst modifier under controlled process conditions in the presence of hydrogen to produce high melt flow polypropylene directly in the polymerization reactor.

Tetraethylorthosilicate (also known as tetraethoxysilane) has been used in propylene polymerization catalyst systems. For example, in an early generation catalyst system using a ball-milled co-crystallized titanium trichloride/aluminum trichloride catalyst component, TEOS was used commercially as a co-catalyst modifier with ethyl aluminum dichloride.

Published application EP 0 445 303 describes an olefin polymerization catalyst composed of a solid catalytic component containing a metal oxide, magnesium, titanium, halogen, and an electron-donating compound, (b) an organometallic compound, and (c) an ethoxysilane compound with a formula $R_n Si(OC_2 H_5)_{4-n}$, wherein R is a $C_3$ to $C_{10}$ aliphatic compound and n is 1 or 2. The catalyst system is described as good in the effect of hydrogen on the melt flow rate. However, the exemplified polymerization process was in slurry and the disclosed polymers had melt flow rates below 400 g/10 min.

Published application EP 0 601 496 describes an olefin polymerization process in which two polymerizations are allowed to coexist. In one polymerization catalyst system, a dialkylalkoxysilane is used as an external modifier, which in the second system an alkoxysilane is used such as propyltriethoxysilane or vinyltriethoxysilane.

Published application WO 95/21203 describes a dual donor catalyst system which includes a mixture of dicyclopentyldimethoxysilane and TEOS. The polymers produced are described a having relatively high melt flow rates and moderately broad molecular weight distributions. However, the exemplified polymerization process is bulk and the highest melt flow polypropylene described had an MFR under 250 g/10 min. Also, shown was that catalyst activity dropped substantially when higher melt flow rate polymers were made.

Published application WO 94/06833 describes the use of TEOS as an external modifier to a specific supported catalyst system in bulk and fluidized bed gas-phase polymerization systems but does not disclose high melt flow polymers.

U.S. Pat. No. 5,529,850 describes a fiber produced from a polyproylene resin using 2,2,6,6-tetramethyl piperidine-containing external modifier and an ether internal electron donor. The resin is characterized by a polydispersity index of 2.5 to 3.7.

An aspect of this invention is to provide a high melt flow propylene polymer. Another aspect of this invention is a process to manufacture high melt flow polypropylene in a polymerization reactor. A further aspect of this invention is a process to manufacture reactor-produced high melt flow propylene polymers at commercially-acceptable yields based on a titanium-containing catalyst component.

In another aspect of this invention, the use of a non-silane external modifier to increase melt flow rate is significantly enhanced. Use of diethyl zinc (DEZ) as an external modifier is known to increase melt flow rate of propylene polymers. However, at the concentration of DEZ required for DEZ to form high MFR polymer, it has been found that the polymer is contaminated with black specks. Use of TEOS in combination with DEZ permits high melt flow rate polymer to be produced at lower concentrations of DEZ without formation of black specks.

The high melt flow products of this invention are useful in producing melt blown fibers, which, typically, may form a non-woven fabric. Uses for melt blown fibers include filters, oil sorbents, and as components in composite non-woven fabrics for medical and hygiene uses.

SUMMARY OF THE INVENTION

A process to produce high melt flow propylene polymer comprises polymerizing propylene in the presence of a titanium-containing, magnesium-containing, high activity catalyst and an aluminum alkyl cocatalyst in a gas phase system which uses condensed liquid to control temperature wherein the external catalyst modifier is a tetraalkylorthosilicate, preferably tetraethylorthosilicate, at process conditions of temperature, hydrogen concentration, and Si/Mg, Al/Mg and Al/Si atomic ratios, to produce a high melt flow propylene polymer at high yield.

DESCRIPTION OF THE INVENTION

High melt flow propylene polymers of this invention are made by contacting propylene monomer with a suitable HAC-catalyst system under specified polymerization conditions to form normally solid, predominantly crystalline polymer. As described below, such polymerization is conducted in the gas phase, preferably a gas-phase system using a condensed monomer stream for process temperature control, in the presence of a sufficient concentration of hydrogen for molecular weight control and a selected silane external modifier. In such polymerization, the catalyst system comprises (a) a magnesium-containing, titanium-containing solid component which typically contains an internal electron donor modifier compound, (b) an aluminum alkyl compound, and (c) an external silane modifier compound. The process of this invention uses a tetraalkylorthosilicate, such as tetraethylorthosilicate, as the selected silane external modifier compound. In order to achieve commercially-acceptable catalyst yields with this catalyst system, the process conditions of (i) temperature, (ii) aluminum to magnesium atomic ratio, and (iii) aluminum to silicon atomic ratio must be controlled.

The most preferable tetraalkylorthosilicate useful in this invention is tetraethylorthosilicate, although other tetra-$C_3$–$C_6$-alkylorthosilicates may be used such as tetra-n-propylorthosilicate, tetra-n-butylorthosilicate, tetra-iso-butylorthosilicate, tetra-s-butylorthosilicate, tetrapentylorthosilicates, tetrahexylorthosilicates may be used. Tetraalkyorthosilicates with mixed alkyls also may be used. Preferably, other silane materials are not used in combination with the tetraalkylorthosilicate external modifier in this invention.

In order to achieve acceptable polymer yields based on the solid titanium/magnesium-containing component, the amount of silane (tetraalkylorthosilicate) and aluminum alkyl cocatalyst is controlled such that the aluminum to magnesium atomic ratio in the polymerization reactor feed is above about 1.5 (typically above about 2) and ranges up to about 15 (typically below about 10 and preferably below about 8). A preferable range of Al/Mg is about 2 to about 4. Similarly, the aluminum to silicon atomic ratio preferably is controlled to above about 5 (typically above about 10) up to about 40 (typically below about 30). A preferable range of Al/Si is about 20 to about 25. Persons skilled in the art will recognize that given the magnesium and titanium contents of a supported catalyst composition, such ratios may be converted to aluminum to titanium, silicon to titanium and silicon to magnesium ratios. Preferably, the Si/Mg ratio is controlled to be less than 1, preferably less than about 0.5, and typically less than about 0.25.

In addition to the stated catalyst components, including the tetraalkylorthosilicate external modifier, hydrogen must be introduced into the reactor to control the molecular weight of the polymer which is reflected in the melt flow rate measurement. The use of tetraalkylorthosilicate, such as TEOS, in this invention permits lesser amounts of hydrogen to produce higher melt flow rates. Without the TEOS modifier, such an excess amount of hydrogen would be required to produce a high melt flow polymer, to be practically impossible to achieve sufficient catalyst yield or to control other process parameters of the system such as temperature using condensed liquid as a cooling medium.

In this invention, hydrogen is incorporated into the polymerization system, typically, at a range of about 1 to about 20 mole percent based on olefin monomer. Preferably, the hydrogen concentration is above about 7 mole percent and ranges up to about 14 mole percent. Typically, a higher melt flow polymer is produced using higher hydrogen concentrations in the polymerization reactor. In order to produce a propylene polymer with a MFR of more than 1200, typically at least 10 to 12 mole percent hydrogen is used.

Temperature should be controlled to achieve a balance between acceptable catalyst activity and a target melt flow rate. Although in typically used temperature ranges, activity generally increases as temperature decreases, the amount of hydrogen required to produce a higher polymer melt flow rate increases. At high hydrogen to olefin ratios in a polymerization system requiring condensed monomer, the gas dew point decreases to an extent a gas condenser is unable to condense enough monomer to maintain reactor pressure. Thus, the polymerization temperature required to produce a desired high melt flow polymer may be higher than typical polymerization systems. Typical polymerization temperatures range from above about 60° C. (preferably about 70° C.) up to about 95° C. (preferably below about 90° C.). A preferable temperature range is about 80 to about 85° C. A typical polymerization temperature is about 82° C. (180° F.).

Within the bounds of temperature, hydrogen concentration, and atomic ratios of silicon, aluminum, titanium, and magnesium, this invention is directed to select such parameters to achieve a commercially-acceptable levels of activity and solubles. As indicated in the experimental data presented relating to this invention, a process regime of relatively low Al/Mg ratio combined with a relatively high Al/Si ratio and an elevated reaction temperature produces a polymerization environment in which the enhanced hydrogen MFR response in the presence of a tetraalkylorthosilicate permits practical production of a reactor grade high melt flow propylene polymer.

It has been found that by combining the process responses to Si/Mg (or Si/Ti), which is inversely logarithmically related to activity, and to Al/Mg (or Al/Ti), which is typically logarithmically directly related to activity, increased activity may be achieved for a particular temperature level. For example, in a particular polymerization system, the log of the yield based on the magnesium content of the polymer, at a polymerization temperature of 82° C. and a hydrogen content of about 10 mole% was correlated to 3.5–0.5 log (Si/Ti)+0.53 log (Al/Ti) where the the aluminum was calculated as free aluminum not bound to any silane modifier. If the polymerization activity observed for a polymer with an MFR>1000 in a system in which the Al/Mg=6 and Al/Si=6 with a temperature of 81° C. and 10 mole % hydrogen is set to unity, process parameters according to this invention are set to achieve an activity of at least 1.25, preferably 1.5, and most preferably 2, according to the teachings of this invention.

Preferably, process parameters are set to achieve a decalin solubles content of the resulting polymer of less than 15 wt. %, preferably, less than 12 wt. %, and most preferably less than 10 wt. %. A typical range of decalin solubles for polymers made according to this invention is 6 to 10. Typically, increasing the Al/Si ratio increases the measured decalin solubles of the resulting resin. Although in conventional systems increasing Al/Si (i.e. adding more silane) increases yield, activity generally decreases with increased TEOS addition. Thus, a balance should be made between acceptably low decalin solubles and polymer yield based on catalyst.

High melt flow polymers of this invention typically have an MFR greater than 400, preferably greater than 1000, and most preferably above about 1200. Maximum melt flow rates for polymers made by this process typically depend upon conditions such as the process equipment's ability to condense the hydrogen/olefin feed and the inherent activity of the catalyst used. Propylene polymers with MFR's up to 2000 and above may be made using the process of this invention. The upper limit of MFR which can be achieved using the gas-phase process of the invention exceeds the MFR of polymer made using bulk or slurry polymerization systems due to the existence of a maximum solubility of hydrogen in a liquid polymerization medium run at commercial operating conditions of temperature and pressure. For example, in a bulk propylene polymerization system, the MFR of the polymer is limited by the maximum solubility of hydrogen in liquid propylene at the temperatures and pressures used in polymerization.

In a practical sense, process parameters also should be set to achieve commercially-reasonable yields of polymer based on catalyst. Typically, a system is set to achieve at least a polymer yield above about 10 (preferably above 14) Kg of polymer per gram of solid catalyst component.

The set of process parameters is chosen for optimum use of the polymerization system employed. The ranges of parameters described herein together with the working examples demonstrate the ability to achieve superior results in obtaining high MFR propylene polymer with acceptable decalin solubles and at reasonable yields. Exact parameters for any specific system thus may be determined by routine experimentation by a person skilled in the art.

In another aspect of the invention, diethyl zinc may be added as an additional external modifier to produce high MFR polymer. An effective amount of DEZ typically is a Zn/Ti ratio above about 1 (preferably above about 5) and may range up to about about 25 (preferably below about 20) without producing unwanted black specks in the polymer product. Use of DEZ alone at Zn/Ti ratios of 30–100 have produced polymer contaminated with black specks. Use of small amounts of DEZ in combination with TEOS is beneficial in that less amounts of hydrogen are needed to produce high MFR polymers. Although TEOS is effective, eventually for high MFR polymers, the hydrogen concentration requirement affects the gas condensation capacity and lowers polymer yield. Small amounts of DEZ allow high MFR polymers to be produced at lower hydrogen concentrations and higher yield.

Resins prepared by this invention typically have polydispersity indices above about 3.7. However, these resins also typically have measured decalin solubles which indicate that the broadening of the molecular weight distribution (MWD) is toward lower molecular weights which is beneficial to producing finer fiber. Conventional resins have a significant broadening of MWD toward higher molecular weights which causes premature crystallization in fiber forming processes. Thus, in conventional resins there has been a paradigm that narrower MWD is better for melt spinning of fibers. However, the low molecular weight "tail" in the MWD of the resins of this invention beneficially may act as an internal plasticizer during fiber formation. Measured decalin solubles for a conventional resin may be increased by increasing the Al/Si ratio. However in doing so, the hydrogen requirement to achieve a high MFR polymer also is increased to a level which may be inoperable in a commercial process.

HAC titanium-containing components useful in this invention generally are supported on hydrocarbon-insoluble, magnesium-containing compounds in combination with an electron donor compound. Such supported titanium-containing olefin polymerization catalyst component typically is formed by reacting a titanium(IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I–III; magnesium alcoholates; or magnesium alkyls.

Numerous individual processes or process steps have been disclosed to produce improved supported, magnesium-containing, titanium-containing, electron donor-containing olefin polymerization or copolymerization catalysts. For example, Arzoumanidis et al., U.S. Pat. No. 4,866,022, incorporated by reference herein, discloses a method for forming an advantageous alpha-olefin polymerization or copolymerization catalyst or catalyst component which involves a specific sequence of specific individual process steps such that the resulting catalyst or catalyst component has exceptionally high activity and stereospecificity combined with very good morphology.

Another magnesium-containing compound, described in U.S. Pat. No. 4,227,370, is based on at least one magnesium alcoholate which may be pretreated with at least one modifier such as mineral acid or anhydrides of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatment. In another catalyst component, magnesium ethoxide may be reacted with an aromatic ester such as phenyl benzoate prior to further treatment with a Lewis acid.

Another possible catalyst component is described in U.S. Pat. No. 4,581,342, assigned to a common assignee, incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium(IV) compound in combination with an organic electron donor compound in a suitable diluent.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

Typically, HAC supported catalyst components useful for polymerizing propylene and higher olefins as well as for polymerizing propylene and higher olefins with a minor amount of ethylene contain an electron donor component as an internal modifier. Such internal modifier is an integral part of the solid supported component as is distinguished from an external electron donor component, which together with an aluminum alkyl component, comprises the catalyst system. The external modifier and aluminum alkyl may be combined with the solid supported component shortly before the combination is contacted with an olefin monomer, although the components may be fed to the reactor separately, typically contained in a liquid diluent such as hexane Generally, organic electron donors have been described as useful in preparation of the stereospecific supported catalyst components including organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors have been described as useful in incorporating into supported catalyst components.

Examples of electron donor systems include those described in U.S. Pat. Nos. 4,971,937, 5,068,213, 5,095,153, and 5,106,807, as well as published European application EP 0 452 156. These references generally describe classes of diethers useful as electron donor components. Other electron donors are described in U.S. Pat. Nos. 3,642,746, 4,186,107, 4,473,660, 4,522,930, 4,565,798, 4,693,990, 4,814,312, 4,829,034, and 4,904,628. All of these patents are incorporated herein.

The internal electron donor typically is a $C_2$–$C_6$ alkyl ester of a $C_5$–$C_{10}$ alkyl or aromatic acid and preferably is a dialkylphthalate wherein each alkyl group may be the same or different and contains from 3 to 5 carbon atoms. Preferably the second electron donor is an o-dialkylphthalate. The second electron donor is preferably a dibutylphthalate and more preferably is di-n-butylphthalate or di-i-butylphthalate.

Internal electron donor materials are incorporated into a solid, supported catalyst component during formation of such component. Typically, such electron donor material is added with, or in a separate step, during treatment of a solid magnesium-containing material with a titanium (IV) compound. Most typically, a solution of titanium tetrachloride and the internal electron donor modifier material is contacted with a magnesium-containing material. Such magnesium-containing material typically is in the form of discrete particles and may contain other materials such as transition metals and organic compounds.

Titanium (IV) compounds useful in preparation of the catalyst or catalyst component of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

The magnesium-containing material, the titanium halide component, and the electron donor components useful in this invention are reacted at temperatures ranging from about −10° C. to about 170° C., generally over a period of several minutes to several hours, and are contacted in amounts such that the atomic ratio of titanium to magnesium components in the reaction mixture (calculated as magnesium in magnesium compound from which the magnesium-containing species is formed) is at least about 0.5:1. Preferably, this ratio ranges from about 0.5:1 to about 20:1. Greater amounts of titanium may be employed without adversely affecting catalyst component performance, but typically there is no need to exceed a titanium to magnesium ratio of about 20:1. More preferably, the titanium to magnesium ratio ranges from about 2:1 to about 15:1 to ensure that the catalyst components contain sufficient titanium to exhibit good activities without being wasteful of the titanium compound employed in preparation. The electron donor components are employed in a total amount ranging up from about 1.0 mole per gram atom of titanium in the titanium compound, and preferably from about 0.001 to about 0.6 mole per gram atom of titanium in the titanium compound. Best results typically are achieved when this ratio ranges from about 0.01 to about 0.3 mole per gram atom of titanium.

Preferably, the aforesaid electron donor compounds and titanium compound is contacted with the precipitated solid particles in the presence of an inert hydrocarbon diluent, although other suitable techniques can be employed. Suitable diluents are substantially inert to the components employed and are liquid at the temperature and pressure employed.

A suitable diluent that can be used in any of the aforesaid steps should be substantially inert to the reactants employed and preferably is liquid at the temperatures and pressures used. A particular step may be conducted at an elevated pressure so that lower boiling diluents can be used at higher temperatures. Diluents may be hydrocarbon-based liquids such as aliphatic, substituted aliphatic, aromatic or substituted aromatic liquids. Although aromatic hydrocarbons, such as toluene, and substituted aromatics are useful, alkane diluents such as hexane and heptane are preferred if minimization of aromatic-containing waste streams is desired. Aromatic hydrocarbons, such as toluene may be useful if such material can be recycled in the manufacturing process. Also useful are higher boiling aliphatic liquids such as kerosene. Mixtures of diluents may be used. One useful diluent component is Isopar G® which is a $C_{10}$-average isoparaffinic hydrocarbon boiling at 156–176° C. Examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-di-chlorobenzene.

Each of the aforesaid preparative steps is conducted in the substantial absence of water, oxygen, carbon monoxide, and other extraneous materials capable of adversely affecting the performance of the catalyst or catalyst component of this invention. Such materials are conveniently excluded by carrying out the procedures in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation steps, there is obtained a solid reaction product suitable for use as a catalyst or catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance. Use of liquid hydrocarbons such as hexane or heptane is preferred to minimize halogenated waste streams.

Although not required, the final solid reaction product prepared may be contacted with at least one Lewis acid prior to polymerization. Such Lewis acids useful according to this invention are materials which are liquid or soluble in a liquid diluent at treatment temperatures and have a Lewis acidity high enough to remove impurities such as unreacted starting materials and poorly affixed compounds from the surface of the solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the final solid reaction product may be washed with an inert liquid hydrocarbon or halogenated hydrocarbon before contact with a Lewis acid. If such a wash is conducted, it is preferred to substantially remove the inert liquid prior to contacting the washed solid with Lewis acid. In an advantageous procedure, the precipitated particles are treated with titanium tetrachloride and then with titanium tetrachloride in the presence of one or more electron donors. More preferably, the product is treated one or more times with a liquid hydrocarbon such as hexane, heptane, or toluene and finally with titanium tetrachloride again.

Although the chemical structure of the catalyst or catalyst components used in this invention is not known precisely, the components generally comprise from about 1 to about 6 weight percent titanium, from about 10 to about 25 weight percent magnesium, and from about 45 to about 65 weight percent halogen. Preferably, the catalyst component of this invention comprise from about 2.0 to about 4 weight percent titanium, from about 15 to about 21 weight percent magnesium and from about 55 to about 65 weight percent chlorine.

In the solid catalyst component typically used in this invention, the atomic ratio of titanium to magnesium typically is above about 0.03 (preferably above about 0.04) and ranges up to about 0.2 (preferably below about 0.1). A preferable range for Ti/Mg is about 0.05 to about 0.09. A typical catalyst component used in this invention has a Ti/Mg atomic ratio of about 0.07.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

Typically, the catalyst or catalyst component of this invention is used in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(Cl_{12}H_{25})_3$. A magnesium, zinc, or aluminum alkyl containing 1 to about 6 carbon atoms per alkyl radical may be used. Aluminum alkyls are preferred and most preferably trialkylaluminums containing 1 to about 6 carbon atoms per alkyl radical, and particularly triethylaluminum and triisobutylaluminum or a combination thereof are used.

If desired, metal alkyls having one or more halogen or hydride groups can be employed, such as ethylaluminum dichloride, diethylaluminum chloride, diethylaluminum hydride, diisobutylaluminum hydride, and the like.

The aforesaid cocatalyst system advantageously and preferably contains the aliphatic silane external modifier described in this invention.

A typical catalyst system for the polymerization or copolymerization of alpha olefins is formed by combining the supported magnesium-containing, titanium-containing catalyst component used in this invention and an alkyl aluminum compound as a co-catalyst, together with the TEOS external modifier. Typically, useful aluminum-to-magnesium atomic ratios in such catalyst systems are about 2 to about 15 and preferably about 2.5 to about 5. Typical aluminum-to-silicon atomic ratios in such catalyst systems are about 6 to about 40 and preferably about 10 to about 30.

The process of this invention produces propylene polymers. Such propylene polymers are produced by polymerizing a feed of propylene, which may contain up to about 10 wt % other alpha-olefin such as ethylene, butene-1, pentene-1, 4-methylpentene-1, or hexene-1 or mixtures thereof. Preferably, according to the invention, highly crystalline propylene polymers are prepared by contacting propylene with the above-described catalyst system of this invention under polymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art.

Typically, a catalyst or catalyst component of this invention is used in amounts ranging from about 0.2 to 0.01 (preferably 0.1 to 0.02) milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 to about 600 psi (140 to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to moderate or terminate polymerization or copolymerization or at least temporarily deactivate the catalyst or catalyst component of this invention, the catalyst can be contacted with water, alcohols, carbon dioxide, oxygen, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques and, especially, melt blowing to form fibers.

This invention is illustrated, but not limited by the following experimental runs.

EXPERIMENTAL RUNS

In order to demonstrate this invention, propylene polymerizations were conducted in a laboratory gas-phase reactor using a magnesium halide supported HAC catalyst component produced in accordance with U.S. Pat. No. 4,886,022. The catalyst component contained 17.32 wt. % magnesium and 2.29 wt % titanium. Triethylaluminum was used as the co-catalyst. The amount of silane (TEOS) modifier was controlled in the polymerizations such that the Al/Si ratio was in the range 6 to 24 and the target melt flow rate (MFR) of the polymer was 1000 to 1300. These propylene polymerizations were performed in a one-gallon (3.8-liter) continuous, horizontal, cylindrical gas-phase reactor measuring 10 cm in diameter and 30 cm in length based on that described in U. S. Pat. No. 3,965,083. The reactor was equipped with an off-gas port for recycling reactor gas through a condenser and back through a recycle line to the recycle nozzles in the reactor. Propylene liquid was used as the quench liquid to help remove the heat generated in the reactor during the polymerization. During operation, polypropylene powder produced in the reactor bed, passed over a weir, and was discharged through a powder discharge system into a secondary closed vessel blanketed with nitrogen. The polymer bed was agitated by paddles attached to a longitudinal shaft within the reactor that was rotated at about 75 rpm. The reactor pressure was maintained 300 psig (2100 kPa). The titanium/magnesium-containing catalyst was introduced into the reactor as a 1.5 wt % slurry in heptane through a liquid propylene-flushed catalyst addition nozzle. A mixture of the silane modifier and triethylaluminum in heptane at Al/Mg and Al/Si molar ratios indicated in Table I were fed separately to the reactor through a liquid propylene-flushed co-catalyst addition nozzle. Hydrogen was fed to the reactor at the concentrations indicated in Table I. Production rate was about 200 g/hr.

Decalin Solubles ("DS") is a measure of hydrocarbon soluble and extractable materials, such as atactic, non-crystalline, and oligomeric components, contained in a propylene polymer and is useful in correlating a particular resin to desirable resin properties such as processing window. DS is determined by completely dissolving a 2.0-gram sample of polymer in 100 milliliters of Irganox 1076-stabilized (0.020 grams/liter) decalin (decahydronaphthalene) by warming the slurry to 165° C. and stirring the slurry for two hours. Once the polymer is dissolved, the solution is allowed to cool overnight (at least 16 hours). After the cooling period, the solution is filtered from the precipitated polymer. A measured portion of the solution is withdrawn and, after removing the decalin solvent, the resulting samples are completely dried in a 120° C. vacuum oven. The final dried samples are weighed to determine the amount of decalin-soluble polymer. Results are reported as a weight percent polymer remaining soluble in decalin.

"Yield" (grams of polymer produced per gram of solid catalyst component) was based on the weight of solid catalyst used to produce polymer. "Extractables" were determined by measuring the loss in weight of a dry sample of ground polymer after being extracted in boiling n-hexane for three to six hours and are reported as the weight percent (wt. %) of the solid polymer removed by the extraction.

At high melt flow rates, the decalin solubles values were observed to be essentially the same as hexane extractables, both as expressed in weight percent.

A method to determine stereoregularity of a propylene polymer uses $^{13}C$ NMR and is based on the ability to identify relative positions of adjacent methyl groups on a polypropylene polymer backbone. If the methyl groups of two adjacent propylene monomer units (—CH(CH$_3$)—CH$_2$—) are on the same side of the polymer chain, such two methyl groups form a meso ("m") dyad. The relative percentage of these meso dyads is expressed as % m. If the two methyl groups of adjacent monomer units are on opposite sides of the polymer chain, such two methyl groups form a racemic ("r") dyad, and the relative percentage of these racemic dyads is expressed as % r. Advances in $^{13}C$ NMR techniques permit measurement of the relative positioning of three, four, and five successive methyl groups, which are referred to as triads, tetrads and pentads, respectively.

Current NMR instruments can quantify the specific distribution of pentads in a polymer sample. There are ten unique pentads which are possible in a propylene polymer:

| | |
|---|---|
| m m m m | r r r r |
| m m m r | m m r m |
| m m r r | m r r m |
| r m m r | r m r m |
| r m r r | m r r r |

A ball and stick representation of the mmmm pentad is:

m m m m
- i - i - i - i - i -

Two of the possible pentads cannot be separated by NMR (mmrm and rmmr) and are reported together. Two of the ten pentads (mmrr and mrrm) result from the displacement of a single methyl group on the opposite side of the polymer chain in an isotactic sequence. Since the mmmm (m4) pentad represents a perfect isotactic stereoregular structure, measurement of this pentad (as % m4) reflects isotacticity and potential crystallinity. As used herein, the term NMR tacticity index is the percent of m4 (% m4) pentads as measured by $^{13}C$ NMR. Thus, if 96% of pentads measured by $^{13}C$ NMR in a propylene polymer are m4, the NMR tacticity index is 96.

Data from the polymerizations are summarized in Table I.

TABLE I

| Run | Silane | Al/Mg[1] | Al/Si | H$_2$ (mole %) | Temp ° C. | MFR (g./ 10 min.) | Polymer Yield[2] (g/g) | Hexane Extract-ables (wt. %) |
|---|---|---|---|---|---|---|---|---|
| 1 | TEOS | 6 | 15 | 15.1 | 71.7 | 1285 | 14313 | 4.29 |
| 2 | TEOS | 9.5 | 6 | 16.1 | 71.7 | 1195 | 6716 | 2.85 |
| 3 | TEOS | 2.5 | 24 | 12.6 | 73.3 | 1225 | 17762 | 3.13 |
| 4 | TEOS | 2.5 | 6 | 11.7 | 72.8 | 1153 | 12181 | 3.15 |
| 5 | TEOS | 6 | 15 | 13.1 | 72.8 | 1160 | 12865 | 3.57 |
| 6 | TEOS | 2.5 | 15 | 9.5 | 81.1 | 1267 | 13550 | 3.82 |
| 7 | TEOS | 6 | 24 | 7.9 | 80.6 | 1178 | 12446 | 4.66 |
| 8 | TEOS | 6 | 6 | 9.8 | 80.6 | 1063 | 7816 | 2.79 |
| 9 | TEOS | 9.5 | 15 | 11.7 | 79.4 | 1156 | 10269 | 3.56 |
| 10 | TEOS | 6 | 6 | 16.7 | 64.4 | 1208 | 12514 | 3.14 |
| 11 | TEOS | 2.5 | 15 | 14.3 | 65.0 | 1181 | 15473 | 3.77 |
| 12 | TEOS | 9.5 | 15 | 17.6 | 65.0 | 1249 | 12793 | 3.79 |
| 13 | TEOS | 6 | 15 | 12.2 | 73.3 | 1175 | 10957 | 3.74 |
| 14 | TEOS | 6 | 24 | 14.8 | 65.0 | 1145 | 14967 | 4.57 |
| 15 | TEOS | 6 | 15 | 16.1 | 73.3 | 1195 | 13361 | 3.47 |
| 16 | TEOS | 6 | 15 | 12.6 | 73.3 | 1095 | 12514 | 3.36 |
| 17 | (5) | 6 | 15 | 5.8 | 84.4 | 1240 | 15068 | 7.05 |
| 18 | (5) | 2.5 | 24 | 5.3 | 73.3 | 1125 | 15793 | 8.88 |
| 19 | TEOS | 6 | 15 | 12.4 | 73.9 | 1300 | 13086 | 3.54 |
| 20 | TEOS | 6 | 15 | 12.9[3] | 73.3 | 1255 | 12793 | 5.84 |
| 21 | TEOS | 6 | 15 | 12.8[4] | 73.3 | 1187 | 15903 | 4.54 |

[1]target value based on feed composition
[2]Based on titanium analysis in polymer
[3]Reaction feed contained 0.35 mole % ethylene; polymer contained 1.6 wt. % ethylene.
[4]Reaction feed contained 0.62 mole % ethylene; polymer contained 2.6 wt. % ethylene.
[5]Tetra-n-propylorthosilicate Another series of experimental runs was performed in a larger apparatus similar to that described above. The apparatus comprised two gas-phase reactors in series equipped with recycle gas condensers.

Data from the polymerizations are summarized in Table II.

TABLE II

| Run | Silane | Al/Mg[1] | Si/Ti[2] | Al/Si[2] | H$_2$ (mole %) | Temp (° C.) | MFR (g./10 min.) | Polymer Yield[2] (g/g) | Decalin Solubles (wt. %) | NMR Tacticity (% m4) |
|---|---|---|---|---|---|---|---|---|---|---|
| 22 | TEOS | 6(5.0) | 14.7 | 6 | 8 | 82.2 | 1823 | 4100 | 3.1 | 92.2 |
| 23 | TEOS | 4(2.9) | 1.83 | 24 | 8 | 82.2 | 1480 | 14500 | 9.87 | 86.8 |
| 24 | TEOS | 4(2.8) | 1.77 | 24 | 9 | 76.7 | 1306 | 16600 | 8.49 | — |

[1]Target atomic ratio value based on feed composition; value based on analysis of polymer in parentheses.
[2]Atomic ratio value based on analysis of polymer.

In a manner similar to Runs 1–21 additional experimental runs were performed testing use of small amounts of diethylzinc (DEZ) as an additional catalyst component. These results are shown in Table III.

TABLE III

| Run | Silane | Al/Mg[1] | Al/Si[1] | Zn/Ti[1] | H$_2$ (mole %) | Temp (° C.) | MFR (g./10 min.) | Relative Polymer Yield[2] | Black Specks |
|---|---|---|---|---|---|---|---|---|---|
| 25 | TEOS | 6 | 15 | 0 | 15.2 | 71 | 1089 | 1.0 | No |
| 26 | TEOS | 6 | 15 | 5.5 | 11.7 | 71 | 1138 | 1.3 | No |
| 27 | TEOS | 6 | 15 | 16.6 | 10.7 | 71 | 1227 | 1.7 | No |
| 28 | TEOS | 6 | 15 | 33.2 | 9.7 | 71 | 1166 | 1.7 | Yes |
| 29 | TEOS | 6 | 15 | 69 | 9.4 | 71 | 1359 | 1.6 | Yes |

[1]Target atomic ratio value based on feed composition; value based on analysis of polymer in parentheses.
[2]Yield calculated on material balance basis with yield for run without DEZ set at 1.0.

These results show that use fo small amounts of DEZ in combination with TEOS produce high MFR polymer with effective hydrogen response and increased yield compared to using TEOS alone. However use of larger amounts of DEZ alone produces black specks in the polymer.

Three samples of high MFR (about 1300) polypropylene resin produced in the gas-phase similar to Run 24, were analyzed for polydispersity index (PI) using a "modulus separation" factor method generally described in U.S. Pat. No. 5,529,850. However, the polymers produced according to this invention have a higher MFR than those measured in U.S. Pat. No. 5,529,850 and the specific measurement techniques described in such patent cannot be used for such high MFR resins. Low viscosity resins with MFR's greater than 1000 tend to flow away from the parallel plate sensor of the RMS-800 Rheometer used in that patent. If the fluid looses contact with the plate, the force measurements are subject to errors. These issues were resolved by using a Rheometrics Dynamic Analyzer RDA II with a Coulette sensor. Results for polymers with MFR less than 1000 are the same for both instruments, but the RDA II instrument is accurate for MFR greater than 1000. Pl measurements for these three samples were 3.94, 3.76, and 3.93. The frequencies (w') used to measure the modulus separation at 500 Pa were 149, 190, and 148, respectively.

What is claimed is:

1. A gas-phase process to produce high melt flow propylene polymer comprising polymerizing propylene in the presence of a titanium-containing, magnesium-containing, supported catalyst component and an aluminum alkyl cocatalyst using effective amounts of a tetraalkylorthosilicate as an external modifier and hydrogen at gas-phase polymerization process conditions, to produce a propylene polymer with a melt flow rate above 400 g/10 min. with decalin solubles less than 15 wt. % wherein the hydrogen concentration is between 1 and 20 mole percent based on olefin monomer.

2. The process of claim 1 wherein the tetraalkylorthosilicate is tetraethylorthosilicate.

3. The process of claim 1 wherein the gas-phase polymerization process uses condensed liquid to control process temperature.

4. The process of claim 1 wherein the resulting product has an MFR greater than 1000 g/10 min.

5. The process of claim 1 wherein the resulting product has an MFR greater than 1200 g/10 min.

6. The process of claim 1 in which the propylene polymer contains up to 5 wt. % ethylene units.

7. The process of claim 1 wherein the temperature is selected from about 60 to about 95° C.

8. The process of claim 7 wherein the hydrogen concentration is above about 10 mole percent based on olefin monomer.

9. The process of claim 1 wherein the Al/Mg atomic ratio is selected from about 1.5 to about 15.

10. The process of claim 1 wherein the Al/Si atomic ratio is selected from about 5 to about 40.

11. The process of claim 1 wherein the Si/Mg atomic ratio is below about 1.

12. The process of claim 1 wherein the yield of polymer product formed from the process is greater than 10 Kg per gram of supported catalyst component.

13. The process of claim 1 in which propylene is polymerized together with up to 5 wt. % ethylene units.

14. The process of claim 1 in which diethyl zinc is used as an additional external modifier.

15. A gas-phase process to produce high melt flow propylene polymer comprising polymerizing propylene in the presence of a titanium-containing, magnesium-containing, supported catalyst component and an aluminum alkyl cocatalyst using effective amounts of tetraethylorthosilicate as an external modifier and hydrogen at gas-phase polymerization process conditions, to produce a propylene polymer with a melt flow rate above 1000 g/10 min. with decalin solubles less than 12 wt. %, wherein the process conditions are selected from
(a) polymerization temperature between about 70 and 90° C.;
(b) hydrogen concentration between about 7 and 14 mole percent based on olefin monomer;
(c) Al/Mg atomic ratio between about 2 and 10; and
(d) Al/Si atomic ratio between about 10 and 30.

16. The process of claim 15 wherein the Si/Mg atomic ratio below about 0.5.

17. The process of claim 15 wherein the yield of polymer product formed from the process is greater than 14 Kg per gram of supported catalyst component.

18. The process of claim 15 wherein the polymerization temperature is between about 80 and 85° C.; the hydrogen concentration is between about 10 and 12 based on olefin monomer; the Al/Mg atomic ratio is between about 2 and 4; the Al/Si atomic ratio is between about 20 and 25; and the Si/Mg ratio is below about 0.25.

19. The process of claim 15 wherein the resulting product has an MFR greater than 1200 g/10 min.

20. The process of claim 15 in which diethyl zinc is used as an additional external modifier at a Zn/Ti ratio of about 1 to about 20.

* * * * *